July 15, 1969    A. MANN    3,455,756
PROCESS FOR PRODUCING FENESTRATED PLASTIC SHEET
Original Filed Feb. 5, 1964

INVENTOR
ALEX MANN

BY
ATTORNEY 3,455,756
PROCESS FOR PRODUCING FENESTRATED
PLASTIC SHEET
Alex Mann, deceased, late of Andover, Mass., by Billyea
Mann, executrix, Andover, Mass., assignor to The General Tire & Rubber Company, a corporation of Ohio
Continuation of application Ser. No. 342,754, Feb. 5, 1964. This application Aug. 21, 1967, Ser. No. 668,278
Int. Cl. B32b 31/00
U.S. Cl. 156—209           6 Claims

ABSTRACT OF THE DISCLOSURE

The invention provides for the manufacture of foraminous plastic sheet material which simulates woven patterns of cane, lace, rattan, or similar fibrous materials.

DESCRIPTION OF THE INVENTION

This application is a continuation of United States application Ser. No. 342,754, filed Feb. 5, 1964, now abandoned.

This invention relates to a novel process of forming a foraminous synthetic plastic sheet. More specifically, the invention is directed to a continuous process for manufacturing open work simulating fenestrated patterns of cane, lace, rattan and similar fibrous materials from thermoplastic sheet.

Hand woven patterns of cane, lace, rattan and similar fibrous materials are both scarce and expensive. This is primarily due to two factors. First, the particular natural material which goes to make up the pattern is often scarce and expensive. Second, although the natural material may be available, skilled craftsmen to produce the patterns are unavailable. Therefore, it is evident that a continuous process for producing good simulations of these patterns from a readily available material, such as synthetic plastic, would be highly desirable and economical.

Plastics have certain inherent advantages over cane, lace, rattan and similar substances in the areas of weather resistance, aging qualities and stain resistance. These advantages are particularly outstanding where the end product is used out of doors; especially in the spoiling atmosphere of the seashore where the high salt content of the air appears to expedite the rate of deterioration of many materials. In addition, the life expectancy of many naturally occurring substances is not as great as that of a properly formulated plastic material. Plastic sheet also has advantages in stain resistance which render it valuable in applications where it might be exposed to hard use or spillage such as tablecloths and dresser scarves which are made by crocheting and tatting. In such end uses the plastic, because of its impervious surface, may be wiped clean while the natural products would require a more involved cleaning procedure if they can in fact be cleaned at all.

In the past plastic sheet materials intended to simulate some of the aforementioned articles have been made. Generally, these simulated articles have been made in one of two ways. One method has been to print a design on clear sheet. The other method has been to stamp out a design in sheet. In some instances, a combination of the two methods has been used. None of these methods, though, provides the depth, or illusion of depth, necessary to properly simulate such diverse materials as cane, lace and other types of open work.

A further disadvantage of the latter process, that requiring a stamping action, is that optimum results are obtained only if here is a very high degree of control of the goods being stamped. If synchronization is not maintained, the result is that the effect, such as it was, is further deteriorated.

The present invention has to a very large degree overcome all of the above-mentioned artistic and technical deficiencies of the prior art processes and yields a product of a heretofore unobtainable realism. In addition, this novel process is continuous and straight-through, thus obviating certain technical problems inherent in discontinuous procedures.

The invention contemplates, in a continuous manner, embossing a design on a plastic sheet so that portions of the design extend beyond the plane of the sheet, and then removing the extending portions so that the sheet is of an open design. As part of the process the sheet may be prepared by lamination of two previously prepared sheets. In many instances, it is desirable for esthetic reasons to coat or print the plastic. This may be accomplished either before or after the embossing. In some instances, it is both feasible and desirable to combine steps of the process. Such an instance is the combination of a laminating and embossing step in those instances, calender preparation, where a laminating step is used. Other such instances will be obvious to those skilled in the art.

Referring now to the drawings wherein like parts are designated throughout by like reference numerals, the process will be described with respect to the manufacture of simulated cane. The process is, of course, equally applicable in the manufacture of other fenestrated materials.

Figure 1:
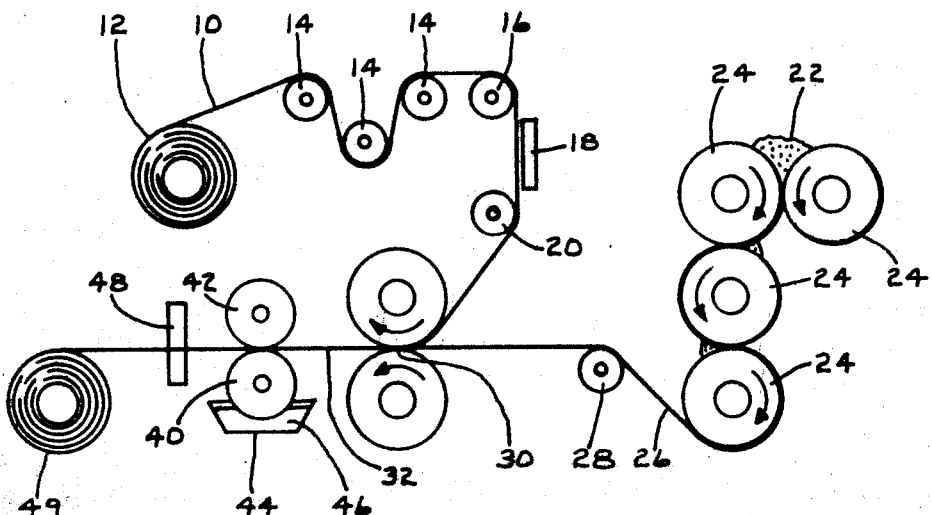
FIGURE 1 is a schematic representation of one version of the process.

A previously prepared plastic sheet material 10 is drawn from storage roll 12, passed over heating rolls 14, over idler roll 16, past heater 18 and over idler roll 20. A preblended resin mixture, such as described below, 22 is added to three-roll calender 24 where it is calendered to produce sheet 26. The sheet 26 is then passed over pick-off roll 28 to the embosser 30 where it is laminated to plastic sheet material 10 and embossed to give composite embossed sheet 32. As noted, the sheets 10 and 26 may be of the same or dissimilar color. This embossing serves two functions; that is, it imparts to the printed sheet a surface which resembles cane, and, secondly, it forces that portion of the sheet which will be subsequently removed to a position outside the plane of the design whereby ease of removal is enhanced.

If space limitations permit, it is possible that both plastic sheets can be prepared as used, using two calenders in conjunction with the laminating and embossing unit. It is also possible that both of the sheets can be prepared prior to the time of use and that the laminate material can be made directly from previously formed sheets. If desired, more than two sheets can be laminated.

The unitary laminate is then passed through a printer comprising printing roll 40 which carries a design and backup roll 42 and ink reservoir 44 containing ink 46. This printing procedure, which is optional, and can be carried out at other stages of the process, enhances the ultimate artistic effect of the final product by heightening the depth and highlighting or emphasizing the overall effect of the final product. The embossed printed material is then passed through a slitter or skiver 48 to remove the above-referred-to portion of the embossed pattern so that there results the desired open work design. The finished product is then stored on wind-up roll 49 from whence it can be removed as needed.

Figure 2:
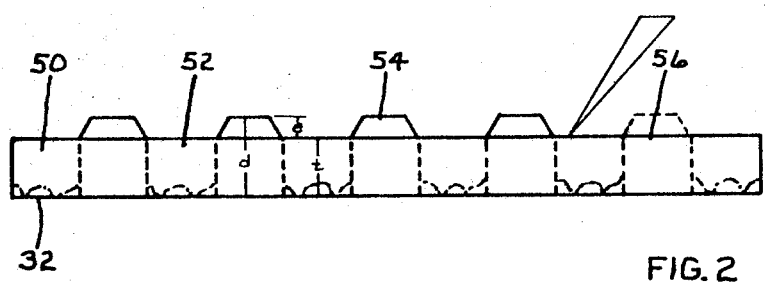
FIGURE 2 represents diagrammatically the end product immediately before and after the final slitting step.

Turning now to FIGURE 2, which is a diagrammatic side view of the material before and after skiving, the embossed sheet 32 when viewed from the side comprises a sheet 50, portions of which 54 have been distended beyond the major portion 52 of the sheet 32. It is noted that that portion of the embossing which will result in the open areas must be of a depth $d$ which is slightly greater than the thickness $t$ of the main portion of the sheet. The portion $e$ extending beyond the sheet is then removed so that there results an opening 56 in the portion of the sheet which had previously carried the embossing. An alternate method would be to remove a very thin skin covering the whole sheet rather than only that portion located over the embossing. It should be noted that the embossing operation, in addition to providing that portion of the sheet which is to be removed, also imparts to that portion of the sheet which remains a design which is part of the over-all effect of the final product.

Depending upon the artistic effect desired, the foregoing process may be varied. For instance, if it is desired, such as in the case of a thin material of one color, such as simulated lace, there is no need for a laminating step and a single thickness of one color may serve as the starting material. In other applications it might prove desirable for artistic or other reasons to use a material of three or even more sheets. Another obvious variation in the process is to eliminate the printing step or to print after either embossing or slitting. This is possible in those instances where the added artistic effect obtained from the printing or other surfacing is not necessary. It is to be noted that although the process has been shown as using sheet material prepared by calendering, it may be prepared otherwise such as by extrusion as discussed below.

The laminating step, although optional, is generally used because of the difficulty of preparing a high quality uniform sheet having a thickness greater than 0.002 inch by calender methods. Sheets of a thickness greater than this are generally nonhomogeneous and contain defects which are referred to in the art as fisheyes and comets; that is, undissolved resin particles. The sheet contemplated by the present invention requires in a number of end uses a thicker sheet than 0.002 inch so that if calendered material is used it must be built up by lamination to the required thickness. Thicker plastic sheet which has been otherwise prepared, for example, by extrusion, can be used in which case the laminating step may be dispensed with.

For some end use application it may prove desirable to give the back of the material a finish coat of some type. Although this can be done either before or after the skiving step, it is better accomplished afterwards. Other possible end uses require a material highly finished on both sides. One method of obtaining such a material is by laminating or otherwise joining two previously prepared sheets both of which have been embossed.

Other obvious modifications of the process of the invention are within the claimed ambit of the invention.

The particular end pattern is not critical and it is only necessary that the open work portions have a minimum depth sufficient to permit the separating operations such as slitting or skiving above referred to. Of course, the open work portion must be contiguous and of a magnitude sufficient to support the whole without pulling apart. Obviously, the total thickness must be sufficient to permit the described operations but should not be so thick as to result in handling problems.

The plastic used may be any calenderable plastic material. Thermoplastics for use in the practice of the invention include plasticized polyvinyl chloride compositions including mixtures and copolymers of vinyl chloride and vinyl acetate, polyvinyl ethers, polyvinyl butyrate, polyethylene, polypropylene polymers and copolymers of acrylates and methacrylates, ethyl cellulose, acrylonitrile-butadiene-styrene copolymers and other cellulose derivatives and the like. The polyvinyl chloride compositions are, however, superior and are preferred. Plasticizers, antioxidants, stabilizers, pigments of various colors, and other additives known in the art may be added as required.

Consideration should be given to the rigidity of the final structure. Designs in the nature of simulated cane, for instance, are of a more rigid nature than those which would simulate a crocheted or tatted dresser scarf. The more rigid simulated canes are primarily used, for example, in end use applications such as chairs and fronting on radios and television sets. The more rigid materials are generally easier to work with, particularly as far as a skiving operation is concerned. The less rigid materials are more difficult to control and require more closely controlled operation of the process.

The following example, which is intended to be by way of illustration and not of limitation, in which parts are parts by weight, illustrates a useful composition:

| | Parts by wt. |
|---|---|
| Polyvinyl chloride resin, Vygen 110 | 60 |
| 2-ethyl hexyl phthalate plasticizer | 30 |
| Butadiene-high acrylonitrile rubber resin, Chemigum N-8 | 27 |
| Styrene-acrylonitrile resin, Tyril 767 | 23 |
| Antimony oxide flame retarder | 6 |
| Barium-cadmium laurate stabilizer, Vanstay HT | 2 |
| Barium-cadmium stearate stabilizer, Ferro 1827 | 1 |
| Dialkyl phenol-sulfide, antioxidant, Santowhite crystals | .25 |
| Stearic acid lubricant | .25 |
| Titanium dioxide, Titanox | 2 |
| Iron oxide | 1 |

The above composition was mixed and calendered according to known procedures in the art. The resulting material was then used as one component of the invention.

A similar composition was compounded except that 0.25 part of the pigment was used in order to obtain a slightly different shade. Other similar compositions may be used by varying the amount of polyvinyl chloride and styrene-acrylonitrile or by substitution of varying amounts and types of the composition.

The two above-described compositions were then treated or processed according to the foregoing description. They were printed with a standard printing brown ink in a mottled design. The resulting product simulated to a very high degree cane of natural origin. Any of a number of inks may be used such as, for example, those known in the art and widely available as gravure vinyl ink concentrates. Most commercially available pigments may be used if they do not contain any materials which would degrade the polymer.

The criticality of the embossing operation has been described above.

The slitting, skiving or other separating operation must be closely controlled so that the desired degree of material is taken off. If this minimum amount is not removed, the resulting product will have a raggedy and nonpleasing appearance. Additionally, care must be taken so that the amount of material removed is not excessive. Otherwise, the thickness and, thus, overall strength of the resulting pattern could be weakened beyond an acceptable point.

Although the invention has been described with respect to the production of a simulated cane, it is, as has been otherwise noted, by proper choice of starting material, use and color of the print rolls, proper choice of embossing pattern and careful control of the skiving operation equally applicable to the production of simulated laces and tatting as well as other open work.

While the invention has been described herein, with particular reference to various preferred embodiments thereof, it will be appreciated that variations from the details given herein can be effected without departing from the invention in its broadest aspects. It is to be understood therefore that changes and variations can be made without departing from the spirit and the scope of the invention.

What is claimed is:

1. A process for producing a continuous length of foraminous plastic sheet having a pattern simulating woven cane comprising the steps of
   (A) selecting a continuous length of plastic sheet having the flexibility characteristics of woven sheets of fibrous material,
   (B) providing said sheet with a decorative finish,
   (C) simultaneously forming in said sheet, by embossing,
       (1) a replica of a design of cane strands raised from the plane of one surface of said sheet and
       (2) interstitial projections extending from the plane of the surface opposite said designed surface, and
   (D) removing said projections whereby foramina are formed in said sheet.

2. The process of claim 1 wherein step (B) follows step (C).

3. The process of claim 1 wherein step (D) is accomplished by slitting.

4. The process of claim 1 wherein the plastic sheet is a laminate of at least two sheets of different colors.

5. A process for obtaining an open pattern in a plastic material having the flexibility characteristics of open patterns of fibrous materials comprising simultaneously forming in said material, by embossing, a pattern raised from the plane of one surface of said material and interstitial projections extending from the plane of the surface opposite said patterned surface and thereafter removing said projections whereby foramina are formed in said sheet.

6. A process for producing a simulated cane design on a plastic material having the flexibility characteristics of woven sheets of fibrous materials comprising laminating first and second plastic sheets of different colors to obtain a laminate body, simultaneously forming in said laminate body, by embossing, a design simulating woven cane raised from the plane of one surface of said body and interstitial projections extending from the plane of the surface opposite said designed surface, coating said embossed body, and removing said projections from said body whereby foramina are formed in said body.

References Cited
UNITED STATES PATENTS

| 2,757,443 | 8/1956 | Steigerwalt et al. | 156—219 |
| 2,925,645 | 2/1960 | Bell et al. | 156—220 |
| 2,912,746 | 11/1959 | Oshry et al. | 156—220 |
| 2,912,748 | 11/1959 | Gray | 156—220 |

EARL M. BERGERT, Primary Examiner

J. C. GIL, Assistant Examiner

U.S. Cl. X.R.

156—252, 267; 161—116, 252